(12) United States Patent
Niederkorn et al.

(10) Patent No.: US 9,361,525 B2
(45) Date of Patent: Jun. 7, 2016

(54) METHOD FOR PROCESSING AN IMAGE SEQUENCE AND TESTER FOR A CAR

(71) Applicant: AUDI AG, Ingolstadt (DE)

(72) Inventors: Dieter Niederkorn, Schrobenhausen (DE); André Kaup, Effeltrich (DE); Dominic Springer, Erlangen (DE); Franz Simmet, Schwabmuenchen (DE)

(73) Assignee: AUDI AG, Ingolstadt (DE)

( * ) Notice: Subject to any disclaimer, the term of this patent is extended or adjusted under 35 U.S.C. 154(b) by 128 days.

(21) Appl. No.: 14/363,446

(22) PCT Filed: Nov. 2, 2012

(86) PCT No.: PCT/EP2012/004580
§ 371 (c)(1),
(2) Date: Jul. 29, 2014

(87) PCT Pub. No.: WO2013/068086
PCT Pub. Date: May 16, 2013

(65) Prior Publication Data
US 2014/0369414 A1  Dec. 18, 2014

(30) Foreign Application Priority Data

Nov. 10, 2011 (DE) .................. 10 2011 118 088
May 18, 2012 (DE) .................. 10 2012 009 876

(51) Int. Cl.
*H04N 7/18* (2006.01)
*G06K 9/00* (2006.01)
(Continued)

(52) U.S. Cl.
CPC ........ *G06K 9/00791* (2013.01); *G01C 21/3626* (2013.01); *G06T 9/001* (2013.01);
(Continued)

(58) Field of Classification Search
CPC .. H04N 7/50; H04N 7/26941; H04N 21/2365
USPC .................................................. 348/142–160
See application file for complete search history.

(56) References Cited

U.S. PATENT DOCUMENTS

| 6,035,067 A | 3/2000 | Ponticos |
| 6,404,461 B1 | 6/2002 | Le Clerc |

(Continued)

FOREIGN PATENT DOCUMENTS

| CN | 1173571 | 10/2004 |
| CN | 101156451 | 4/2008 |

(Continued)

OTHER PUBLICATIONS

Xianguo Zhang et al., "An Efficient Coding Scheme for Surveillance Videos Captured by Stationary Cameras," Proceedings of SPIE, vol. 7744, 2010, 10 pages.

(Continued)

*Primary Examiner* — Andy Rao
(74) *Attorney, Agent, or Firm* — Staas & Halsey LLP

(57) ABSTRACT

A method identifies motion in an image sequence, which method involves an image processing device ascertaining a change of position of image features in a current image in respect of a reference image. In the method there is a paired association of corresponding image features, one of which can be found in the current image and one of which can be found in the reference image. Model parameters a determined, which describe the change of position for a motion model on the basis of the image features which are associated with one another. A static region is ascertained for the current image, in which static region the change of position of the image contents contained therein is smaller than a predetermined amount, and the model parameters are determined by using only image features which can be found outside the at least one static region.

18 Claims, 3 Drawing Sheets

(51) Int. Cl.
| | |
|---|---|
| *G01C 21/36* | (2006.01) |
| *G06T 9/00* | (2006.01) |
| *H04N 19/527* | (2014.01) |
| *H04N 19/54* | (2014.01) |
| *H04N 19/543* | (2014.01) |
| *H04N 19/61* | (2014.01) |
| *H04N 19/507* | (2014.01) |

(52) U.S. Cl.
CPC ............ *H04N 19/527* (2014.11); *H04N 19/54* (2014.11); *H04N 19/543* (2014.11); *H04N 19/507* (2014.11); *H04N 19/61* (2014.11)

(56) References Cited

U.S. PATENT DOCUMENTS

| | | |
|---|---|---|
| 8,390,697 B2 | 3/2013 | Matsuura et al. |
| 2004/0167395 A1 | 8/2004 | Behrenbruch et al. |
| 2008/0192827 A1 | 8/2008 | Beric et al. |
| 2010/0124274 A1* | 5/2010 | Cheok .................. H04N 19/176 375/240.03 |

FOREIGN PATENT DOCUMENTS

| | | |
|---|---|---|
| CN | 102238332 | 11/2011 |
| DE | 102011118088.9 | 11/2011 |
| DE | 102012009876.6 | 5/2012 |
| WO | PCT/EP2012/004580 | 11/2012 |

OTHER PUBLICATIONS

Amrita Ganguly et al., "Fast Mode Decision Algorithm for H.264/AVS using Edge Characteristics of Residue Images," ICVGIP '10, Dec. 12-15, 2010, pp. 512-517.
"Motion Estimation" from Wikipedia, Downloaded Oct. 4, 2012, 2 pages.
Lichun Li et al., "Image Matching Based on Epipolar and Local Homography Constraints," Proceedings of SPIE, vol. 6833, 2007, 7 pages.
"Motion Compensation" from Wikipedia (in German), downloaded Oct. 4, 2012, 3 pages, together with English language Wikipedia page downloaded Jun. 6, 2014, 7 pages.
Ralf Schäfer et al., "The emerging H.264/AVC standard," EBU Technical Review, Jan. 2003, pp. 1-12.
Changfeng Niu et al., "Moving Object Segmentation in the H.264 Compressed Domain," Computer Vision, ACCV 2009, Sep. 23, 2009, pp. 645-654.
Michael Hötter et al., "Image Segmentation Based on Object Oriented Mapping Parameter Estimation," Signal Processing 15, 1988, pp. 315-334.
Thomas Wiegand et al., "Affine Multipicture Motion-Compensated Prediction," IEEE Transactions on Circuits and Systems for Video Technology, vol. 15, No. 2, Feb. 2005, pp. 197-209.
Cătălin Golban et al., "A Practical Method for Ego Vehicle Motion Estimation from Video," IEEE 5$^{th}$ International Conference on Intelligent Computer Communication and Processing, Aug. 27, 2009, pp. 87-94.
Chang Yuan et al., "Detecting Motion Regions in the Presence of a Strong Parallax from a Moving Camera by Multiview Geometric Constrainsts," IEEE Transactions on Pattern Analysis and Machine Intelligence, vol. 29, No. 9, Sep. 2007, pp. 1627-1641.
Dominic Springer et al., "Compression of 2D and 3D Navigation Video Sequences Using Skip Mode Masking or Static Areas," 2012 Picture Coding Symposium, May 7-9, 2012, pp. 301-304.
A. Á. Ramirez Acosta et al., "Analyzing video object motion focusing on non-planar rotation for two video applications," Proceedings of the 15$^{th}$ International Conference on Computing, 2006, 4 pages.
German Office Action for German Priority Patent Application No. 10 2012 009 876.6, issued Oct. 5, 2012, 7 pages.
English Language International Search Report for PCT/EP2012/004580, mailed May 24, 2013, 3 pages.
Chinese Office Action for related Chinese Patent Application No. 201280055247.2, issued Oct. 12, 2015, 6 pages.
German Office Action dated Dec. 1, 2015 from German Patent Application No. 10 2012 009 876.6, 9 pages.
WIPO English language translation of the International Preliminary Report on Patentability for PCT/EP2012/004580, mailed Oct. 8, 2015, 10 pages.

* cited by examiner

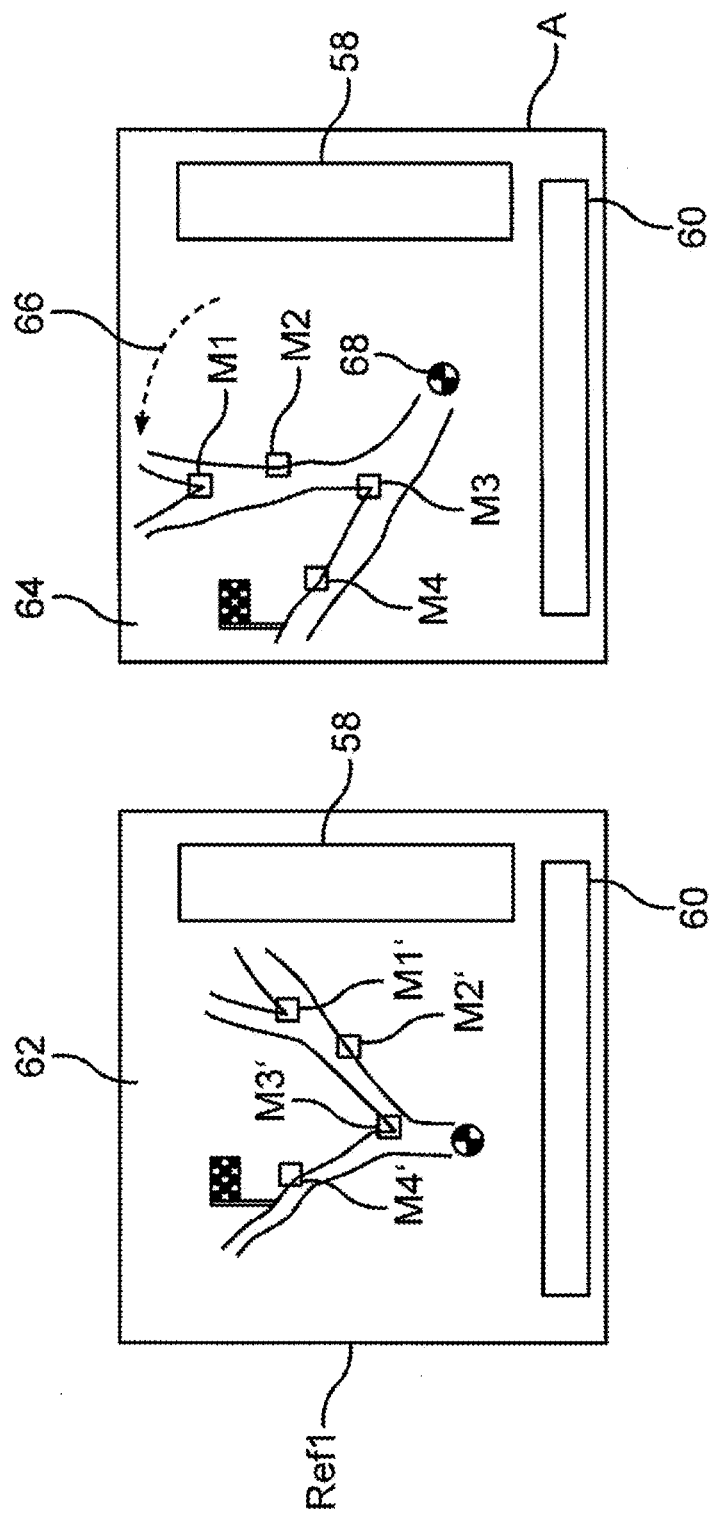

METHOD FOR PROCESSING AN IMAGE SEQUENCE AND TESTER FOR A CAR

CROSS REFERENCE TO RELATED APPLICATIONS

This application is based on and hereby claims priority to International Application No. PCT/EP2012/004580 filed on Nov. 2, 2012 and German Application Nos. 10 2011 118 088.9 filed Nov. 10, 2011 and 10 2012 009 876.6 filed May 18, 2012, the contents of which are hereby incorporated by reference.

BACKGROUND

The invention relates to a method for processing an image sequence, involving ascertaining a change of position, in a current image, for objects depicted in said image with respect to a reference image. The inventors also propose a tester for a motor vehicle that has a video coding device.

In order to be able to store an image sequence representing a succession of images, so as to have as few data as possible, video coding may involve provision for image compression in which image contents from a current image are described by indicating just the difference between the current image and a reference image (what is known as interprediction). In this case, a compression gain is usually obtained by virtue of more bits being necessary for indicating absolute color intensity values for an image than for coding the differences between the color intensity values of the reference image and of the current image. If an image sequence shows a moving object, this compression gain can be attained by virtue of matching image regions from the two compared images initially being found in order to determine the difference. If the object is situated in a top left corner in the reference image and in a bottom right corner in the current image, for example, because the object is moving diagonally through the image detail that is shown, then it makes no sense to calculate a difference between the top left corner of the reference image and simply the top left corner of the current image. Instead, an image processing device first of all needs to ascertain a change of position in the current image for objects depicted therein with respect to the reference image. The motion recognized in this process can be described in different ways. By way of example, the model parameters can be ascertained for a previously stipulated motion model. For this purpose, the RANSAC algorithm (RANSAC—random sample consensus) is known, for example. This involves the recognition of mapping parameters from a mapping specification for rotating and/or translationally moving image regions on the basis of striking image features. These image features are depictions of features of the objects that are shown both in the current image and in the reference image. In order to be able to detect such features and associate them with one another, the actual RANSAC algorithm needs to be preceded by processing, for example by a SIFT algorithm (SIFT—scale-invariant feature transform) or a SURF algorithm (SURF—Speeded Up Robust Features). Such feature detection and matching delivers feature pairs each comprising a feature from the reference image and a feature from the current image that correspond to one another optically. Usually, a predetermined number of feature pairs is provided.

The feature detection and association and a subsequent calculation of model parameters for recognizing the motion of the objects usually works efficiently only when only the motion of a very large object or similar motions of a large number of small objects have caused the alteration in the current image, however. If instead a plurality of objects move in different directions, it is very difficult firstly to find suitable feature pairs and secondly to recognize the different motions from the features. If this fails, features of moving objects cannot be correctly associated with one another. Accordingly, in connection with the coding of image sequences, as produced by a navigation appliance for a screen display in a motor vehicle, a relatively small compression gain has been established. Such image sequences are desirable to record for test purposes. The image sequences are distinguished in that they usually show a map region that is rotated on the basis of how the motor vehicle is currently oriented with respect to a north/south axis, for example. At the same time, however, the screens also show status bars and menus, which always remain at the same position in the image regardless of the orientation of the motor vehicle. The rotating map regions on the one hand and the status bars and menus on the other hand are objects that execute different motions in the image sequence.

In this regard, a technical paper by Zuliani et al (Zuliani, Kenney, Manjunath: "The MULTIRANSAC algorithm and its application to detect planar homographies", Proc. IEEE International Conference on Image Processing, Genova, Italy, September 2005) describes a multimodel RANSAC approach in which different mapping parameters are determined for individual objects in a plurality of iterations. The correct segmentation of the individual objects is not always possible, however. The success of the multimodel RANSAC approach is highly dependent on whether the first iteration has delivered correct results. In addition, the computation complexity for ascertaining the mapping parameters is very high.

SUMMARY

It is one possible object to provide a method for processing an image sequence, which method is used to achieve improved motion recognition with little computation complexity.

The inventors propose a method based on the described motion recognition in an image sequence. An image processing device thus ascertains the change of position of image features in a current image with respect to corresponding image features in a reference image. To this end, image features from the current image, on the one hand, and the reference image, on the other hand, are associated with one another in pairs. This can be effected by the SIFT algorithm or SURF algorithm already described, for example. On the basis of the mutually associated image features, model parameters for a motion model are then determined that describe the change of position. In this case too, it is fundamentally possible to resort to an already known algorithm, such as the aforementioned RANSAC algorithm. According to the proposal, however, provision is now made for at least one steady region first of all to be ascertained, for the current image, in which the change of position of the image contents contained therein is less than a predetermined degree. In this case, at least one image region in the current image is thus sought that has not changed or has changed only slightly in comparison with the reference image, as just defined by the prescribed degree. To find such a region, the color intensity values of the individual image points in the two images can be subtracted from one another, for example. Regions in which the absolute value of the difference is less than a predetermined threshold value can then be regarded as unchanged. As already explained, an image sequence for a navigation appliance would, as expected, be the status bars and the menu bars, for which there are no significant changes.

In a further part of the method, only such image features as are situated outside the at least one steady region are then taken as a basis for determining the model parameters. In case of the aforementioned navigation image sequence, this would thus mean that the status bars and the menu bars are excluded from the determination of the model parameters, and only rotating map regions are taken into account. In particular, the method and device has provision for just a single motion model to be provided.

The method has the advantage that the model parameters now describe the motion of the image regions that are also actually moving in an image. The proposals are based on the insight that a significant improvement in the validity of the model parameters is attained by masking the steady image regions when forming the feature pairs or ultimately when determining the model parameters. The reason is that in the case of methods from the related art there is a high probability of steady image contents also being covered by the algorithms during the paired association of image features. The reason is that steady image contents have a greater certainty of being recognized as corresponding to one another.

In a development of the method, the at least one steady region is determined on the basis of what is known as skip mode information that is produced by a video coder during video coding of the current image. This results in the advantage that the motion recognition can be integrated into a video coder with very little additional computation complexity. The skip mode information is data that, for each image block, as is usually taken as a basis for video coding, a check is already performed as standard to determine whether this image block from the current image actually differs from the corresponding image block from the reference image. If this is not the case, the skip mode information indicates that this image block does not need to be coded in the first place (to skip) and instead the image block from the reference image needs to be used.

In one development of the method, the reference image is transformed by the model parameters, and the transformed reference image is transmitted to a compression device of a video coder as a motion-compensated reference image. During compression of the current image, which compression is based on the description described at the outset for the image differences between the current image and the reference image, a direct comparison between the motion-compensated reference image and the current image is now advantageously possible. If just a single motion model is taken as a basis for this, this embodiment of the method results in global motion compensation (GMC).

The motion compensation can also be linked to a standard video coder without difficulty, so that the strengths of the already existent motion compensation can be used further. In this regard, one embodiment of the method provides for action to be taken only where a standard video coder shows weaknesses, namely during compensation for rotation. In this case, the image processing device takes the model parameters as a basis for first of all checking whether the change of position comprises a rotation. The motion-compensated reference image calculated by the model parameters is then transmitted to the compression device only if an angle of rotation for this rotation is greater than a predetermined threshold value. The threshold value can be based on a rotation of more than 3°, particularly more than 10°, for example. The development results in the advantage that a standard video coder can be specifically assisted in the coding of image sequences that contain rotations of the image contents, which can normally be compensated for only inadequately using standard algorithms for motion compensation.

It has been found to be particularly beneficial if the method involves the model parameters ascertained being matrix values for a transformation matrix for transforming homogeneous coordinates. This advantageously allows particularly rotations and other changes of position for the image features, which change the position frequently found in navigation image sequences, to be reproduced by simple mathematical transformations.

In another embodiment of the method, the paired association of the image features involves a check being performed for at least one possible feature pair to determine whether said feature pair satisfies what is known as the epipolar condition. The epipolar geometry can be used to check, in a manner that is particularly efficient in terms of computation, whether the feature pair may have arisen from meaningful geometric mapping. If this is not the case, the feature pair can be regarded as based on an incorrect association and can be rejected.

As has been found, the method is particularly well suited to use in an H.264 encoder, which is also called an MPEG4 encoder. Therefore, in one embodiment of the method, the image processing device carries out global motion compensation for an H.264 encoder on the basis of the model parameters. In contrast to global motion compensations that are known from the related art, the implementation is particularly efficient in terms of computation and can be provided for an H.264 encoder, the hardware of the encoder only needing to be equipped with slight additional computation power. It has been found to be just as advantageous to carry out the method in a video encoder based on the HEVC (High Efficiency Video Coding) standard.

In the case of use in an encoder, one embodiment of the method furthermore also provides for the model parameters to be transmitted to a video decoder. This can then likewise produce a motion-compensated reference image directly on the basis of the transmitted model parameters, which means that the decoding can also be speeded up. In this connection, the second method accordingly provides for a video decoder to be operated by first of all decoding a reference image, receiving a current coded image and also the model parameters from a motion model, transforming the decoded reference image on the basis of the model parameters and then decoding the current coded image on the basis of the transformed reference image.

As already explained, the compression gain that can be obtained by the method can be implemented particularly in connection with the processing of image sequences from a navigation appliance. In this connection, the inventors propose a tester for a motor vehicle that has an image processing device that is designed to receive an image sequence from a navigation appliance in the motor vehicle and to ascertain model parameters for a motion model for a current image from the image sequence for motion recognizing on the basis of an embodiment of the method.

In a development of the tester, image sequence is also coded by a video coding device, in which case the image processing device is additionally designed to calculate a motion-compensated reference image for the current image from the image sequence on the basis of the model parameters. The compression gain that can be attained when the image sequence is video coded allows the image sequences to be stored with fewer data. It is thus possible to undertake longer test drives for the purpose of testing the navigation appliance without the tester needing to be provided with a larger memory for storing the image sequences than is the case for usual testers of this kind.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 3 shows a schematic illustration of two images from an image sequence that is produced by a navigation appliance in the motor vehicle from FIG. 1.

DETAILED DESCRIPTION OF THE PREFERRED EMBODIMENT

Figure 1:
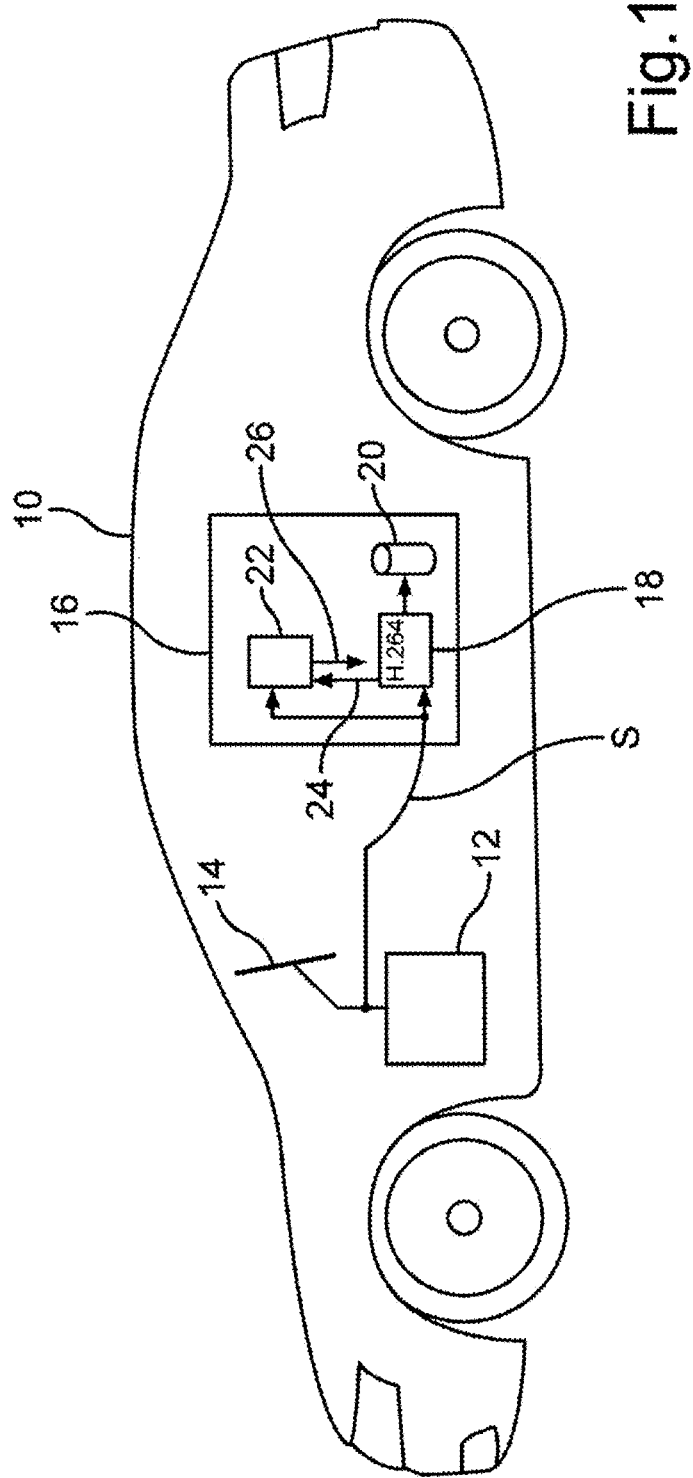
FIG. 1 shows a schematic illustration of a motor vehicle that contains a preferred embodiment of the proposed tester.

Reference will now be made in detail to the preferred embodiments of the present invention, examples of which are illustrated in the accompanying drawings, wherein like reference numerals refer to like elements throughout.

In the example explained below, the described respective parts of the tester and the method are each single features that are able to be considered independently of one another and that each also develop the concept independently of one another and hence can also be regarded as part of the proposal individually or in a different combination than that shown. Furthermore, the embodiments described can also be augmented by further features that have already been described.

FIG. 1 shows a motor vehicle 10, which may be an automobile, for example. During a test drive, a check is performed in the motor vehicle 10 to determine whether a navigation appliance 12 that is installed in the motor vehicle 10 presents road maps and further information in a desired manner on a screen 14. To this end, a test driver (not shown) drives the motor vehicle 10 along a test route. In order to allow the test driver to concentrate on the traffic, the image sequence S produced by the navigation appliance 12 is recorded by a tester 16 during the test drive. The image sequence S can then be evaluated after the journey has ended.

For the recording, the image signal from the navigation appliance 12, which image signal is formed by the presence of the image sequence S, is transmitted to the tester 16 via a cable. By way of example, provision may be made for the cable to be used to transmit an LVDS video signal (LVDS—Low Voltage Differential Signal) to the tester 16. The tester 16 compresses the image sequence S using a video coder 18 and stores the compressed image sequence in a data memory 20. By way of example, the video coder 18 may be an H.264 video coder or an HEVC video coder. The compression rate that is attained with the video coder 18 is higher than in the case of a standard video coder of the same type. To this end, the functionality of the video coder 18 has been extended by an image processing device 22.

The image processing device 22 provides additional motion compensation for the video coder 18. To this end, it receives the image sequence S. It uses a connection 24 to receive skip mode information from the video coder 18. The image processing device 22 can use a connection 26 to transmit a motion-compensated reference image for a current image that needs to be coded to the video coder 18. The video coder 18 and the image processing device 22 may each be software for a digital signal processor or else parts of an FPGA (field programmable gate array) or of an ASIC (application specific integrated circuit) or else a program from a CPU (general purpose processing unit), for example. The image processing device 22 may also be integrated in the video coder 18.

The manner of operation of the video coder 18 and of the image processing device 22 is explained below with reference to FIG. 2 and FIG. 3.

Figure 2:
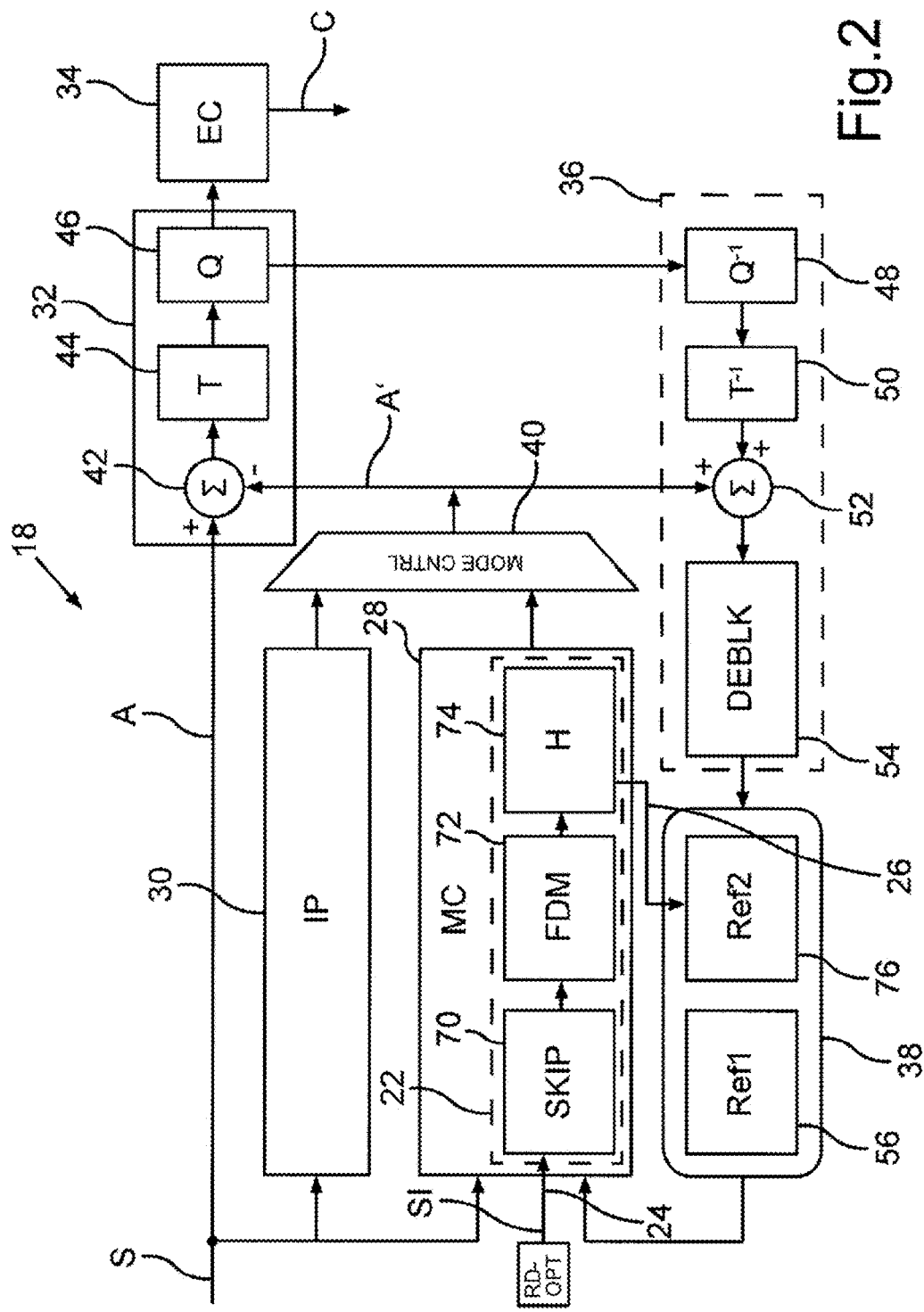
FIG. 2 shows a block diagram for a video coder that implements a preferred embodiment of the proposed method.

In the case of the embodiment shown in FIG. 2, the image processing device 22 is integrated in a motion compensation section 28. Furthermore, the video coder 18 has an intra-prediction section 30 (local prediction within an image), a difference image computation unit 32, an entropy encoding section 34, a decoding unit 36 and a reference image memory 38 in the known manner. A mode controller 40 can be used to change over between the intra-prediction section 30 and the motion compensation section 28 on the basis of a quality measure, as is already known for other motion compensations from the related art.

The entropy coding section 34 produces the compressed bit stream C, which is stored on the data memory 20. In this regard, the entropy coding section 34 receives from the difference image computation section a difference image that by a subtractor 42 that calculates the difference between the image data from a current image A and a predicted image A' for the current image A. The difference image is transformed in blocks by a transformation section 44 (for example a discrete cosine transformation—DCT). A quantizer 46 quantizes the transformation coefficients. The quantized transformation coefficients are then transmitted to the entropy coding section 34. Furthermore, the quantified coefficients are transmitted to an inverse quantizer 48 of the decoding unit 36, the output values from which are transformed by an inverse transformation section 50 and are added to the predicted image A' for the current image A by a summator 52. The current image reconstructed in this manner is filtered by a deblocking filter 54, and the reconstructed image improved in this manner is stored as a first reference image in a first list location 56 for a reference image list in the reference image memory 38. The reference image memory 38, the motion compensation section 28 and the difference image computation section 32 are a compression device of the video coder 18.

In order to understand the explanations that follow, it is important to know that prior to the handling of the current image A the list location 56 contains the reference image Ref1 that has been calculated from the preceding image.

The text below explains how the predicted image A' is calculated from the current image A by the motion compensation section 28. As has just been explained, during this calculation the first list location 56 in the reference image memory 38 also contains, as reference image Ref1, the improved, reconstructed image from the preceding image, as has been produced by the deblocking filter 54.

FIG. 3 shows the reference image Ref 1 and the current image A by way of example. Both images Ref 1, A come from the image sequence S, as produced by the navigation appliance 12. Both images display a status bar 58 and a menu bar 60. The status bar 58 and the menu bar 60 are shown in a foreground of the images Ref 1, A. A map detail 62, in which a journey route is marked for a driver of the motor vehicle 10, forms a background in the reference image Ref1. The map detail 62 displayed in the reference image Ref 1 most closely matches a map detail 64 that can be seen in the current image A. The map detail is rotated by the navigation appliance 12 on the basis of a direction of travel of the motor vehicle 10. On the basis of travel through a curve, the map detail 64 has therefore been rotated with respect to the map detail 62. In this case, the image contents of the map detail 64 have been rotated about a current position 68 of the motor vehicle 10 by a rotation 66, for example. By contrast, the status bar 58 and the menu bar 60 are always shown at the same position in both images Ref1, A. They are steady regions that do not change with the vehicle orientation.

The motion compensation section 28 has a skip mode block 70. The skip mode block 70 receives a piece of skip mode information SI for individual image blocks from a rate distortion optimizer (RD optimizer) RD-OPT, said skip mode information indicating for each image block whether the image information contained therein for the current image A differs significantly from the reference image Ref1. By way of example, such an image block may have the size 16×16 pixels. In order to calculate the skip mode information SI, the color intensity values of the individual pixels of a block in the current image A and of a corresponding block in the reference image Ref1 can be subtracted from one another. Next, the absolute values of the differences are summed for the individual pixels. If the sum is below a predetermined threshold value, it can be assumed that the two blocks are almost identical. In that case, the skip information SI signals this identity. From the skip mode information SI, the skip mode block 70 recognizes that the status bar 58 and the menu bar 60 are steady regions that have not moved. This information is used as masking information. It is transferred to a feature detection and matching block, or FDM block 72 for short, that is located downstream of the skip mode block 70.

The FDM block 72 performs feature recognition in the current image A and the reference image Ref1. To this end, the FDM block 72 can perform the SIFT algorithm or the SURF algorithm, for example. In this case, the features are detected by the FDM block 72 only outside the steady regions, i.e. outside the status bar 58 and the menu bar 60. These steady regions are recognized by the FDM block 72 from the mask information of the skip mode block 70. In the example illustrated in FIG. 3, the FDM block 72 recognizes features (M1 to M4, M1' to M4') in both images A, Ref1. In the FDM block 72 feature association is performed, so that corresponding features are combined into feature pairs M1-M1', M2-M2', M3-M3' and M4-M4'. The feature pairs are transferred to an estimation device 74.

By way of example, this can be implemented in the form that the coordinates of the individual features in the respective images A, Ref 1 are transmitted, together with the information about which coordinates belong together.

The estimation device 74 calculates model parameters for a motion model on the basis of the feature pairs. The model parameters configure the motion model such that it describes the rotation 66. By way of example, the estimation device 74 can perform the RANSAC algorithm for the estimation of the model parameters. The feature pairs comprise only features that are situated outside the steady regions 58, 60.

In the present example, the model parameters are matrix entries for a transformation matrix H. The matrix H describes a projective transformation that can be used to transform the coordinates x of an image point in the current image A. This results in the transformed image point with the coordinates x', which forms an image point of the predicted image A' for the current image A. The transformation is given by the following equation:

$$Hx = x'$$

The estimation device 74 checks whether the transformation matrix H corresponds to the identity matrix or at least a difference with respect to the identity matrix is below a predetermined threshold value. If this is the case, the estimation device 74 takes no further action for the current image A. The current image A is then processed in the known manner of the H.264 standard. The same also applies to the case in which the transformation matrix H describes exclusively a translation. This can be compensated for sufficiently well just by compensation algorithms that the motion compensation section 28 contains as standard, which are not part of the image processing device 22.

If the transformation matrix H has a significant proportion of a rotation, in this case the rotation 66, the reference image Ref1 is transformed by the transformation matrix H into a further reference image Ref2, which is likewise stored in the reference image memory 38 as a second list entry 76 for the list of reference images. In the present case, the video coder 18 is designed on the basis of the H.264 standard. Accordingly, the two reference images Ref 1 and Ref 2 can be stored in the inherently known L0 list in the reference memory 38 as first and second "reference frames". The list entries 56 and 76 are then the first and second list entries in the L0 list, respectively.

On account of the transformation with the transformation matrix H, the reference image Ref2 presents the map detail 62 from the reference image Ref 1 rotated in the same way as was also obtained for the current image A on the basis of the rotation 66. The reference image Ref2 is therefore an estimation of the current image A in relation to the map detail 64. The information matrix H is applied to all image points in the reference image Ref1. The reference image Ref2 is therefore a globally motion-compensated image. In the reference image Ref2, the steady regions 58, 60 have likewise been rotated as well. This information is of no use for calculating the difference image in the difference image computation unit 32. The calculation by the subtractor 42 is therefore carried out image block by image block in the case of the video coder 18. For each image block in the current image A, this involves comparison of the image block with the corresponding image blocks in the reference image Ref1 and in the reference image Ref2 in order to decide whether an image block needs to be taken from the reference image Ref1 or from the reference image Ref2 in order to form the relevant image block of the predicted image A'. The steady regions 58, 60 are automatically taken from the reference image Ref1 by this approach. Therefore, no complex calculations are required in order to construct a global motion-compensated image in which the steady regions 58, 60 would be corrected.

The combination of the video coder 18 and the image processing device 22 provides the following three advantages over the related art, in particular. In contrast to ordinary algorithmic solutions with a plurality of motion models, such as the multimodel RANSAC, the stabilization of the model parameter estimation can be achieved with minimal additional complexity. This is possible because the traditional video encoding process is reliant on a skip mode calculation, and this computation would need to be performed in all cases. In the case of static or steady regions with a single-color background, the skip mode decisions can be taken directly by the encoder, this representing approximately no additional computation complexity. In the case of steady regions with transparency, the skip mode calculations of the encoder merely need to be augmented by computation instructions of small scope.

As a result, the feature recognition and feature association in the FDM block 72 and in the estimation device 74, the outlier determination and the parameter calculation take place merely on the basis of those image regions that belong to rotated and/or translationally shifted map regions 62, 64. Incorrect determination of the model parameters or destabilization of the model parameter estimation by superimposition of different motion models (rotation 66 on the one hand and steady behavior, i.e. no change of position for the steady regions 58, 60, on the other hand) are therefore avoided.

The evaluation of the skip mode decisions of the video encoder allows very precise estimation of which regions in the navigation sequence are adopted by static image regions. Changes in the static regions take place relatively rarely and with a great deal of local limiting, as a result of which they can influence the correct model parameter estimation only imperceptibly even in the case of encoding by a non-skip-block mode. The proposals are therefore capable of ascertaining the associated model parameters of a motion model for map movements reliably and robustly.

The high caliber of the model parameter estimations allows the continuous support of the video encoding process with an additional, projectively transformed reference image, that is to say in the example the reference image Ref2. In this case, caliber means both the robustness of the estimation and the reduction in the residual error in the ascertained model parameters. At high caliber, it is possible to lower the complexity in terms of bit rate that is needed for encoding a navigation sequence at constant image quality. It also allows the quality of the encoded video to be increased in comparison with a traditional video coder for a constant bit rate.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for recognizing motion in an image sequence, in which an image processing device ascertains a change of position for current image features in a current image with respect to corresponding reference image features in a reference image, the method comprising:
   identifying mutually corresponding image features by pairing current image features in the current image and reference image features in the reference image;
   ascertaining at least one steady region for the current image, the at least one steady region having current image features that have a change of position with respect to the reference image that is less than a predetermined degree;
   determining model parameters for a motion model to describe the change of position of only mutually corresponding image features that are situated outside the at least one steady region;
   transforming the reference image with the model parameters to produce a transformed reference image;
   checking the model parameters using the image processing device, the model parameters being checked to determine whether the change of position comprises a rotation; and
   transmitting the transformed reference image to a compression device of a video coder as a motion-compensated reference image, the transformed reference image being transmitted such that if the rotation is determined, the transformed reference image is transmitted only if an angle of rotation is greater than a predetermined threshold value.

2. The method according to claim 1, wherein the at least one steady region is determined based on skip mode information that is produced by the video coder during video coding of the current image.

3. The method according to claim 1, wherein the model parameters ascertained are matrix values for a transformation matrix for transforming homogeneous coordinates.

4. The method according to claim 3, wherein checking the model parameters using the image processing device comprises checking whether the transformation matrix is an identity matrix.

5. The method according to claim 1, wherein identifying mutually corresponding image features comprises checking for at least one possible feature pair to determine whether the feature pair satisfies an epic polar condition.

6. The method according to claim 1, wherein the image processing device carries out global motion compensation for an H.264 encoder or an HEVC encoder based on the model parameters.

7. The method according to claim 1, wherein the model parameters are transmitted to a video decoder.

8. The method according to claim 1, wherein if the change of position exclusively relates to a translational movement:
   the reference image is not transformed with the model parameters, and
   no transformed reference image is transmitted to a compression device.

9. The method according to claim 1, wherein the reference image is transformed with the model parameters only if the angle of rotation is greater than the predetermined threshold value.

10. The method according to claim 1, wherein mutually corresponding image features are identified only for features that are situated outside the at least one steady region.

11. The method according to claim 1, wherein
   when the reference image is transformed, the at least one steady region is rotated together with a remainder of the reference image, and
   mutually corresponding image features are identified only for features that are situated outside the at least one steady region.

12. The method according to claim 1, wherein the reference image is transformed so as to globally rotate the reference image with a single motion model by the angle of rotation.

13. The method according to claim 12, wherein when the reference image is transformed, the at least one steady region is rotated together with a remainder of the reference image.

14. The method according to claim 1, wherein if no transformed reference image is transmitted, a coder reference image from the video coder is transmitted instead of the transformed reference image.

15. A tester for a motor vehicle comprising:
   an image processing device to receive an image sequence from a navigation appliance in the motor vehicle and to ascertain model parameters for a motion model for a current image from the image sequence for recognizing motion; and
   a video coding device to code the image sequence,
   wherein the image processing device is designed to:
      ascertain a change of position for current image features in the current image with respect to corresponding reference image features in a reference image;
      identify mutually corresponding image features by pairing current image features in the current image and reference image features in the reference image;
      ascertain at least one steady region for the current image, the at least one steady region having current image features that have a change of position with respect to the reference image that is less than a predetermined degree;

determine model parameters for a motion model to describe the change of position of only mutually corresponding image features that are situated outside the at least one steady region;

transform the reference image with the model parameters to produce a transformed reference image;

check the model parameters, the model parameters being checked to determine whether the change of position comprises a rotation; and transmit the transformed reference image to a compression device of a video coder as a motion-compensated reference image, the transformed reference image being transmitted such that if the rotation is determined, the transformed reference image is transmitted only if an angle of rotation is greater than a predetermined threshold value.

16. The method according to claim 1, wherein the at least one steady region for the current image comprises at least one foreground object.

17. The method according to claim 1, wherein the model parameters correspond to matrix entries for a transformation matrix, if the transformation matrix is an identity matrix or substantially corresponds to an identity matrix, the transformed reference image is not transmitted to the compression device, and if the transformation matrix indicates that the change of position of the mutually corresponding image features corresponds to exclusively a translation, the transformed reference image is not transmitted to the compression device.

18. The method according to claim 1, wherein the model parameters correspond to matrix entries for a transformation matrix, if the transformation matrix indicates that the change of position of the mutually corresponding image features corresponds to the angle of rotation greater than the predetermined threshold value, the reference image is transformed with the model parameters to produce the transformed reference image by applying the transformation matrix to all image points in the reference image, and the method further comprises:

calculating a predicted image comprises automatically using image data corresponding to the at least one steady region from the reference image, and using image data outside of the at least one steady region from one of the reference image and the transformed reference image, and calculating a difference image between the current image and the predicted image.

\* \* \* \* \*